United States Patent
Cho

(10) Patent No.: US 7,564,655 B2
(45) Date of Patent: Jul. 21, 2009

(54) ACTUATOR OF HARD DISK DRIVE HAVING ARM MEMBER WITH RAISED BLADE PART

(75) Inventor: Han-rae Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 504 days.

(21) Appl. No.: 11/289,443

(22) Filed: Nov. 30, 2005

(65) Prior Publication Data

US 2006/0158788 A1 Jul. 20, 2006

(30) Foreign Application Priority Data

Jan. 14, 2005 (KR) ............... 10-2005-0003759

(51) Int. Cl.
*G11B 5/55* (2006.01)
(52) U.S. Cl. ............................................. 360/266
(58) Field of Classification Search ............... 360/266, 360/266.1, 265.7
See application file for complete search history.

(56) References Cited

U.S. PATENT DOCUMENTS

| | | | | |
|---|---|---|---|---|
| 6,765,764 | B1 * | 7/2004 | Misso et al. | 360/266.1 |
| 7,050,270 | B1 * | 5/2006 | Oveyssi et al. | 260/266 |
| 7,420,783 | B2 * | 9/2008 | Byun et al. | 360/265.7 |

FOREIGN PATENT DOCUMENTS

| | | |
|---|---|---|
| JP | 2001-195845 | 7/2001 |
| JP | 2004-139692 | 5/2004 |
| KR | 1994-12335 | 6/1994 |
| KR | 1999-53020 | 7/1999 |
| KR | 100260407 | 4/2000 |
| KR | 2000-28988 | 5/2000 |

OTHER PUBLICATIONS

Notice to Submit Response issued by the Korean Intellectual Property Office in the corresponding Korean Application No. 10-2005-0003759, dated Jul. 20, 2006 (4 pages).

* cited by examiner

*Primary Examiner*—A. J. Heinz
(74) *Attorney, Agent, or Firm*—Staas & Halsey LLP

(57) ABSTRACT

An actuator with fewer components and a method of easily fabricating the actuator. The actuator includes first and second arm members stacked over each other, head gimbal assemblies respectively fixed to front ends of the pair of arm members, and a fastening mechanism fastening the pair of arm members. Each of the first and second arm members includes a core part coupled to the fastening mechanism and a blade part horizontally extending from the core part to have a different height from the core part and coupled to the head gimbal assembly. The blade part of the first arm member extends from the core part to have a greater height than the core part of the first arm member and the blade part of the second arm member extends from the core part to have a lower height than the core part of the second arm member so that a distance between the pair of blade parts of the pair of arm members can be greater than a width of a disk that is a data recording medium.

7 Claims, 4 Drawing Sheets

ACTUATOR OF HARD DISK DRIVE HAVING ARM MEMBER WITH RAISED BLADE PART

CROSS-REFERENCE TO RELATED APPLICATIONS

This application claims the priority of Korean Patent Application No. 10-2005-0003759, filed on Jan. 14, 2005, in the Korean Intellectual Property Office, the disclosure of which is incorporated herein in its entirety by reference.

BACKGROUND OF THE INVENTION

1. Field of the Invention

The present invention relates to a hard disk drive (HDD), and more particularly, to an actuator of an HDD supporting a head slider to write data on a disk or read data written to the disk, and a method of fabricating the actuator.

2. Description of the Related Art

Hard disk drives (HDDs), which are auxiliary memory devices for computers or the like, read data stored in a disk or write new data to the disk using a head slider. During operation of the HDDs, the head slider is kept floating at a predetermined flying height over the disk and a magnetic head mounted on the head slider reads data stored in the disk or writes new data to the disk. An actuator having a front end to which the head slider is attached moves the head slider to a predetermined position on the disk.

FIG. 1 is an exploded perspective view of a conventional actuator 10.

Referring to FIG. 1, the conventional actuator 10 includes first and second arm members 11 and 21 formed by a pressing process, a voice coil member 33 interposed between the pair of arm members 11 and 21, an arm body 30 passing through the first and second arm members 11 and 21 and the voice coil member 33, and a nut 38 engaging with an end portion of the arm body 30 with a washer 36 therebetween to fasten the pair of arm members 11 and 21 and the voice coil member 33. Suspensions 13 and 23 are respectively coupled to front end portions of the first and second arm members 11 and 21 by a swaging process. Head sliders 15 and 25 are attached to the suspensions 13 and 23, respectively.

In the meantime, spacers 17 and 27 are respectively interposed between the first arm member 11 and the voice coil member 33 and between the second arm member 21 and the voice coil member 33 to maintain a proper interval between the pair of arm members 11 and 21.

Since the actuator 10 having this structure requires the spacers 17 and 27 to maintain the interval between the pair of arm members 11 and 21, the number of components is large, thereby increasing production costs. Furthermore, since the spacers 17 and 27 should be sequentially fitted around the arm body 30, assembly time increases and productivity decreases.

SUMMARY OF THE INVENTION

Additional aspects and/or advantages of the invention will be set forth in part in the description which follows and, in part, will be apparent from the description, or may be learned by practice of the invention.

The present invention provides an actuator with fewer components.

The present invention provides a method of easily fabricating an actuator.

According to an aspect of the present invention, there is provided an actuator including: first and second arm members stacked over each other; head gimbal assemblies respectively fixed to front ends of the pair of arm members; and a fastening mechanism fastening the pair of arm members, where each of the first and second arm members includes a core part coupled to the fastening mechanism, and a blade part horizontally extending from the core part to have a different height from the core part and coupled to the head gimbal assembly, where the blade part of the first arm member extends from the core part to have a greater height than the core part of the first arm member and the blade part of the second arm member extends from the core part to have a lower height than the core part of the second arm member so that a distance between the pair of blade parts of the pair of arm members can be greater than a width of a disk that is a data recording medium.

The fastening mechanism may include an arm body passing through the first and second arm members, and a nut engaging with an end portion of the arm body that passes through the pair of arm members.

A through-hole through which the arm body passes may be formed in each of the core parts of the first and second arm members.

The actuator may further include a voice coil member interposed between the first arm member and the second arm member.

The actuator may further include at least one arm member coupled to the fastening mechanism and allowing a head gimbal assembly to be fixed thereto.

According to another aspect of the present invention, there is provided a method of fabricating an actuator including: fixing head gimbal assemblies to front ends of first and second arm members, respectively; stacking the pair of arm members; and fastening the stacked pair of arm members using a fastening mechanism, where each of the first and second arm members includes a core part coupled to the fastening mechanism, and a blade part horizontally extending from the core part to have a different height from the core part and coupled to the head gimbal assembly, where the blade part of the first arm member extends from the core part to have a greater height than the core part of the first arm member and the blade part of the second arm member extends from the core part to have a lower height than the core part of the second arm member so that a distance between the pair of blade parts of the pair of arm members can be greater than a width of a disk that is a data recording medium.

The fastening of the stacked pair of arm members using the fastening mechanism may include: passing an arm body through the first and second arm members; and engaging a nut with an end portion of the arm body that passes through the pair of arm members.

The passing of the arm body through the first and second arm members may include passing the arm body through through-holes formed in the core parts of the first and second arm members.

The stacking of the pair of arm members may include interposing a voice coil member between the pair of arm members.

The method may further include stacking at least one arm member, to which a head gimbal assembly is fixed, together with the first and second arm members and fastening the at least one arm member using the fastening mechanism.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE PREFERRED EMBODIMENTS

Figure 1:
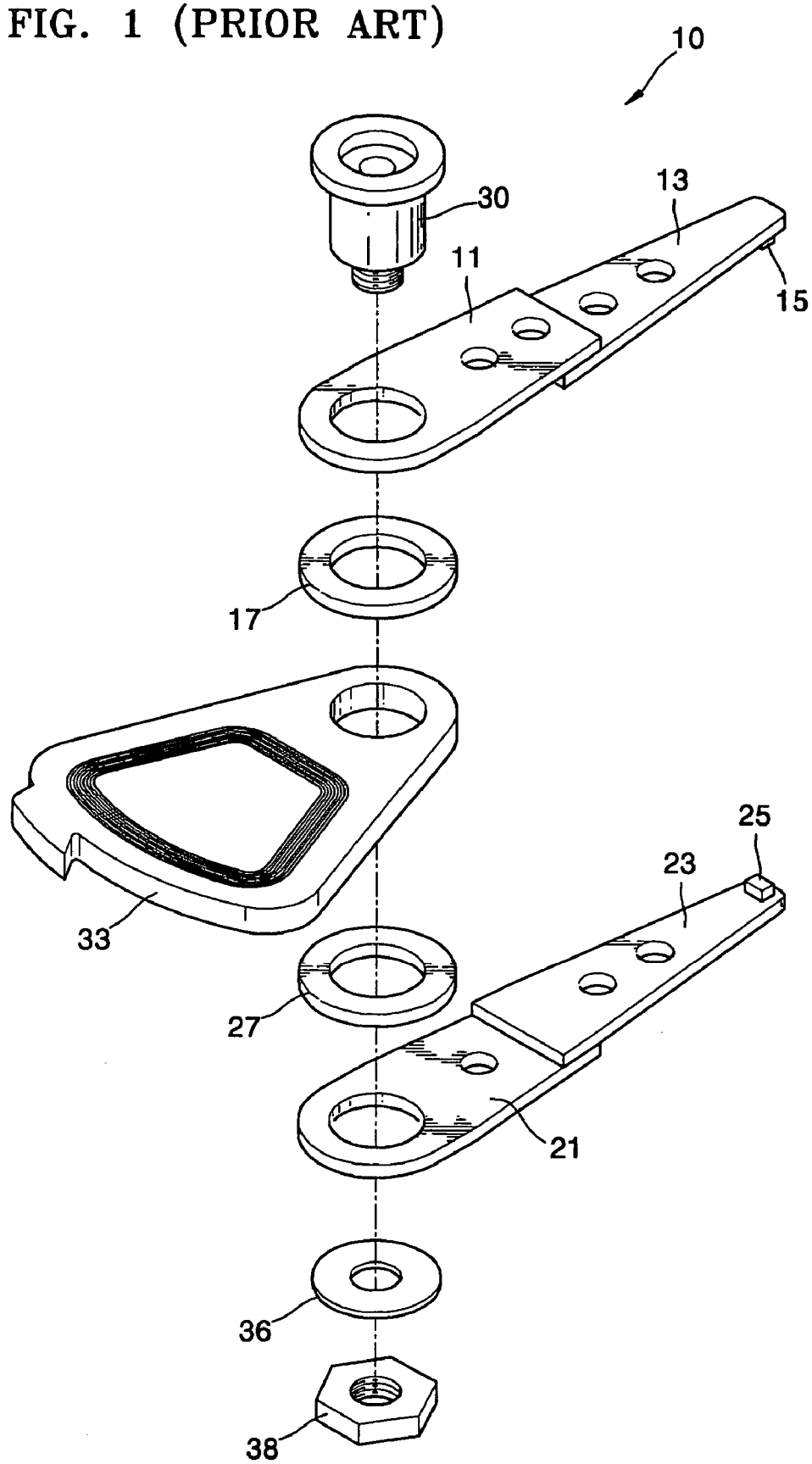
FIG. 1 is an exploded perspective view of a conventional actuator.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
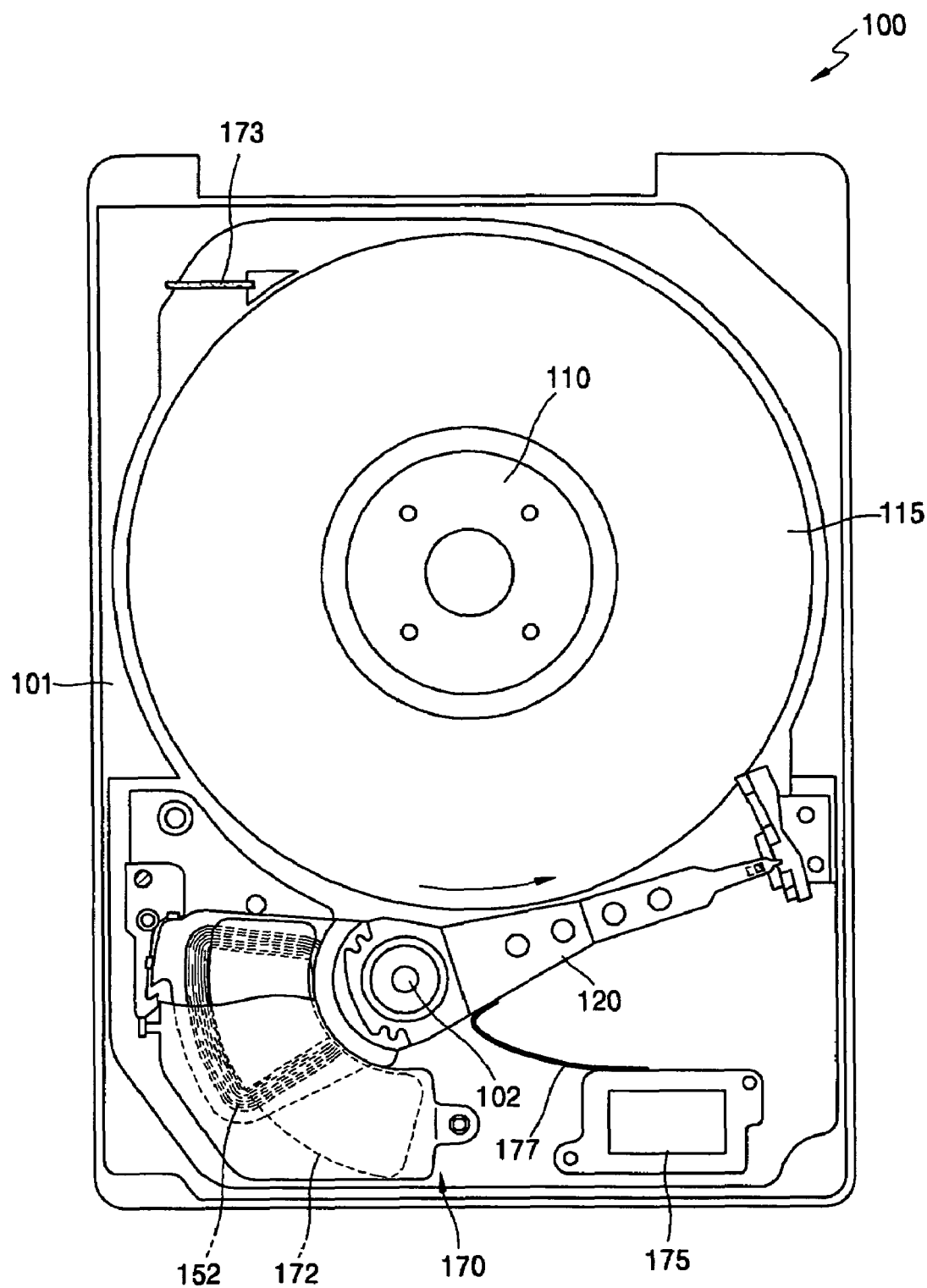
FIG. 2 is a top plan view of a hard disk drive (HDD) having an actuator according to an embodiment of the present invention.
Figure 3:
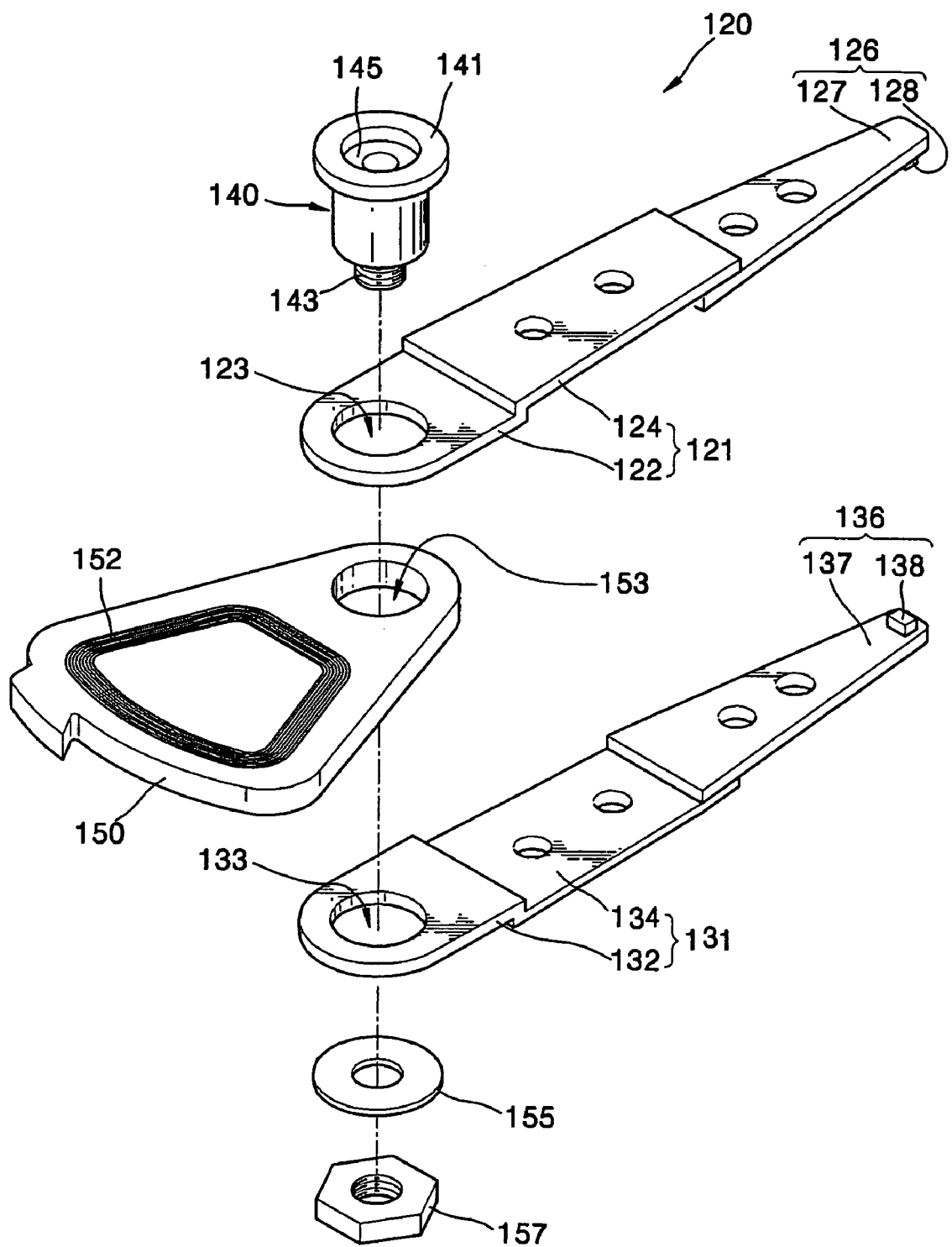
FIG. 3 is an exploded perspective view of the actuator according to an embodiment of the present invention.
Figure 4:
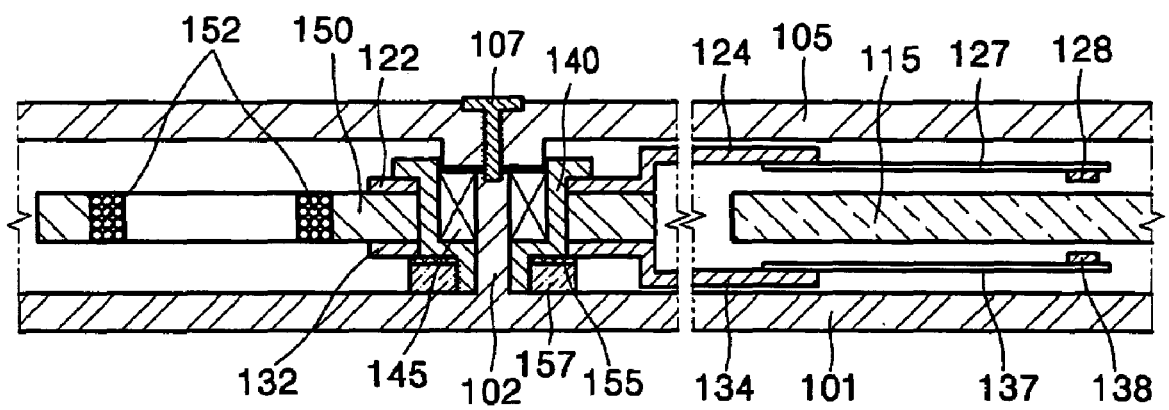
FIG. 4 is a cross sectional view of the actuator according to an embodiment of the present invention.

FIG. 2 is a top plan view of a hard disk drive (HDD) having an actuator according to an embodiment of the present invention. FIGS. 3 and 4 are an exploded perspective view and a cross-sectional view of the actuator according to an embodiment of the present invention, respectively.

Referring to FIG. 2, an HDD 100 includes a base plate 101 and a cover plate 105 (see FIG. 4), which jointly form a housing, and also includes a spindle motor 110, a disk 115, an actuator 120, and a voice coil motor (VCM) 170 residing in the housing.

The spindle motor 110 for rotating the disk 115 is fixed to the base plate 101. The disk 115 is coupled to a rotor (not shown) of the spindle motor 110 to rotate together with the rotor.

The actuator 120 includes a pair of head sliders 128 and 138 (see FIGS. 3 and 4) respectively facing top and bottom surfaces of the disk 115, and moves the pair of head sliders 128 and 138 to predetermined positions on the disk 115 to write data on the disk 115 or read data written to the disk 115, which will be explained later in detail.

The VCM 170 fixed to the base plate 101 provides torque for rotating the actuator 120. The VCM 170 includes magnets 172 disposed over and under a coil 152 of the actuator 120. The VCM 170 is controlled by a servo control system, and rotates the actuator 120 in a direction according to Fleming's Left Hand Rule due to an interaction between current input to the coil 152 and magnetic fields formed by the magnets 172.

A flexible printed circuit (FPC) bracket 175 is disposed at a corner of the base plate 101 to connect an FPC 177, which is connected to the actuator 120, to a main circuit board (not shown) located under the base plate 101. Meanwhile, a recursive filter 173 for filtering foreign substances such as particles in the air in the HDD 100 is disposed at a corner of the base plate 101 diagonal to the corner where the FPC bracket 175 is disposed.

If the HDD 100 is turned on, the disk 115 rotates at high speed and the head sliders 128 and 138 attached to the actuator 120 are lifted to a predetermined height over a surface of the disk 115 and kept floating due to a balance between a lifting force generated by airflow induced by the rotation of the disk 115 and an elastic force of suspensions 127 and 137 (see FIGS. 3 and 4). In this state, the actuator 120 moves the head sliders 128 and 138 to predetermined positions on the disk 115 to write data to the disk 115 or read data from the disk 115.

Referring to FIGS. 3 and 4, the actuator 120 includes first and second arm members 121 and 131 arranged in parallel, a voice coil member 150 interposed between the pair of arm members 121 and 131, and a pair of head gimbal assemblies (HGAs) 126 and 136 respectively fixed to front end portions of the first and second arm members 121 and 131 by a swaging process. Further, the actuator 120 also includes a fastening mechanism composed of an arm body 140 and a nut 157 for fastening the pair of arm members 121 and 131 and the voice coil member 150.

The first and second arm members 121 and 131 may be formed by pressing stainless steel, and respectively include core parts 122 and 132 and blade parts 124 and 134. Through-holes 123 and 133 through which the arm body 140 passes are respectively formed in the core parts 122 and 132. The blade parts 124 and 134 horizontally extend from the core parts 122 and 132.

The blade part 124 of the first arm member 121 extends from the core part 122 to have a greater height than the core part 122, and the blade part 134 of the second arm member 131 extends from the core part 132 to have a lower height than the core part 132. Since the blade part 124 of the first arm member 121 is higher than the core part 122 and the blade part 134 of the second arm member 131 is lower than the core part 132, a distance between the pair of blade parts 124 and 134 is greater than a distance between the pair of core parts 122 and 132. Accordingly, although the distance between the pair of core parts 122 and 132 is less than a width of the disk 115, the distance between the pair of blade parts 124 and 134 is greater than the width of the disk 115.

A through-hole 153 through which the arm body 140 passes is formed in the voice coil member 150, and the coil 152 interacting with the magnets 172 of the VCM 170 is wound around the voice coil member 150.

The HGAs 126 and 136 respectively include the suspensions 127 and 137 coupled to front end portions of the blade parts 124 and 134 and the head sliders 128 and 138 attached to the front end portions of the suspensions 127 and 137. The head sliders 128 and 138 are attached to surfaces of the suspensions 127 and 137 facing the disk 115. The suspensions 127 and 137 are made of stainless steel, and elastically bias the head sliders 128 and 138 toward the disk 115.

The arm body 140 passes through the through-holes 123, 133, and 153 respectively formed in the pair of arm members 121 and 131 and the voice coil member 150 to fasten the members 121, 131, and 150. A flange 141 is formed along an upper end portion of the arm body 140, and a male screw 143 is formed at an outer circumferential surface of a lower end portion of the arm body 140. The nut 157 engages with the male screw 143 of the arm body 140 passing through the through-holes 123, 133, and 153 such that the first and second arm members 121 and 131 and the voice coil member 150 can be fastened. A washer 155 is interposed between the second arm member 131 and the nut 157 to further firmly fasten the members 121, 131, and 150.

Referring to FIG. 4, a pivot bearing 145 is inserted into the arm body 140, a pivot shaft 102 protruding from the base plate 101 is inserted into the pivot bearing 145. Accordingly, the actuator 120 is rotatably mounted on the base plate 101, and the pair of head sliders 128 and 138 can face the top and bottom surfaces of the disk 115 during operation of the HDD 100.

A method of fabricating the actuator 120 will now be explained.

First, the HGAs 126 and 136 are respectively fixed to the front end portions of the blade parts 124 and 134 of the first and second arm members 121 and 131. Then, the first and second arm members 121 and 131 and the voice coil member 150 are stacked so that the voice coil member 150 can be interposed between the first arm member 121 and the second arm member 131. Next, the arm body 140 passes through the through-holes 123, 133, and 153 of the members 121, 131, and 150. Thereafter, the male screw 143 formed at the lower end portion of the arm body 140 engages with the nut 157 with the washer 155 therebetween to fasten the members 121, 131, and 150, thereby completely fabricating the actuator 120.

Since the actuator according to the present invention does not require spacers, the number of components can be reduced and production costs can be lowered.

Also, since the actuator can reduce the distance between the core parts of the first and second arm members and reduce the length of the arm body as compared with a conventional actuator, the HDD employing the actuator can be made thin.

Moreover, since the method of fabricating the actuator does not include fitting a plurality of spacers around the arm body, the actuator can be more easily fabricated and productivity can be enhanced.

While the present invention has been particularly shown and described with reference to exemplary embodiments thereof, it will be understood by those of ordinary skill in the art that various changes in form and details may be made therein without departing from the spirit and scope of the present invention as defined by the following claims. For example, the HDD may have two or more disks, and at least one more arm member fastened by the fastening member corresponding to the disks.

What is claimed is:

1. An actuator comprising:
   first and second arm members stacked over each other;
   head gimbal assemblies respectively fixed to front ends of the pair of arm members; and
   a fastening mechanism fastening the pair of arm members, wherein each of the first and second arm members comprises a core part coupled to the fastening mechanism with the core part of the first arm member spaced vertically from the part of the second arm member, a blade part horizontally extending from the core part, and a head gimbal assembly coupled to the blade part,
   a distance between blade parts of the first and second arm members is greater than a distance between the core parts of the first and second arm members, and
   a distance between the pair of blade parts of the first and second arm members is greater than a width of a disk between the first and second arm members that is a data recording medium.

2. The actuator of claim 1, wherein the fastening mechanism comprises an arm body passing through the first and second arm members, and a nut engaging with a lower end portion of the arm body that passes through the pair of arm members.

3. The actuator of claim 2, wherein a through-hole through which the arm body passes is formed in each of the core parts of the first and second arm members.

4. The actuator of claim 2, wherein a flange is formed along an upper end portion of the arm body.

5. The actuator of claim 2, wherein the lower end portion of the arm body comprises a male screw.

6. The actuator of claim 1, further comprising a voice coil member interposed between the first arm member and the second arm member.

7. The actuator of claim 1, further comprising at least one arm member coupled to the fastening mechanism and allowing a head gimbal assembly to be fixed thereto.

* * * * *

UNITED STATES PATENT AND TRADEMARK OFFICE
CERTIFICATE OF CORRECTION

PATENT NO. : 7,564,655 B2  Page 1 of 1
APPLICATION NO. : 11/289443
DATED : July 21, 2009
INVENTOR(S) : Han-rae Cho It is certified that error appears in the above-identified patent and that said Letters Patent is hereby corrected as shown below:

Column 6, Line 5, before "part" insert --core--.

Signed and Sealed this

Third Day of November, 2009

David J. Kappos
*Director of the United States Patent and Trademark Office*